United States Patent
Yamada

(10) Patent No.: US 7,581,354 B2
(45) Date of Patent: Sep. 1, 2009

(54) GLASS RUN AND STRUCTURE OF FIXING THE SAME

(75) Inventor: Yoshinobu Yamada, Nishikasugai-gun (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 465 days.

(21) Appl. No.: 11/440,450

(22) Filed: May 25, 2006

(65) Prior Publication Data

US 2006/0265995 A1    Nov. 30, 2006

(30) Foreign Application Priority Data

May 30, 2005    (JP)    ............... 2005-156991

(51) Int. Cl.
*E06B 7/16*    (2006.01)
(52) U.S. Cl. ........................ 49/479.1; 49/440
(58) Field of Classification Search ............... 49/440, 49/441, 479.1, 489.1, 495.1, 475.1; 296/146.9
See application file for complete search history.

(56) References Cited

U.S. PATENT DOCUMENTS

| | | | | |
|---|---|---|---|---|
| 4,969,295 A | * | 11/1990 | Nishikawa et al. | ............ 49/502 |
| 5,317,835 A | * | 6/1994 | Dupuy et al. | ................. 49/441 |
| 5,527,583 A | * | 6/1996 | Nozaki et al. | ................. 428/99 |
| 5,655,333 A | * | 8/1997 | Yamashita | .................... 49/441 |
| 5,693,419 A | * | 12/1997 | Nozaki | ....................... 428/354 |
| 6,021,609 A | * | 2/2000 | Teishi | ......................... 49/479.1 |
| 6,189,951 B1 | * | 2/2001 | Deguchi | .................. 296/146.9 |
| 6,493,992 B2 | | 12/2002 | Goto | |
| 2001/0015035 A1 | | 8/2001 | Nozaki | |
| 2006/0162256 A1 | * | 7/2006 | Tsuchida et al. | ........... 49/479.1 |

FOREIGN PATENT DOCUMENTS

| | | |
|---|---|---|
| JP | A-H08-295134 | 11/1996 |
| JP | A-H11-20564 | 1/1999 |
| JP | A-2000-190787 | 7/2000 |

* cited by examiner

*Primary Examiner*—Katherine W Mitchell
*Assistant Examiner*—Michael J Keller
(74) *Attorney, Agent, or Firm*—Posz Law Group, PLC

(57) ABSTRACT

A glass run is fixed on a channel of a doorframe, which includes a garnish for decorating a vehicle interior. The glass run includes an extruded portion and a molded corner portion. The molded corner portion connects two extruded portions. The molded corner portion includes a cover lip, which covers a gap between the garnish and the doorframe, and an insert lip, which is inserted into the gap. The cover lip is discontinuously formed with the insert lip.

12 Claims, 4 Drawing Sheets

US 7,581,354 B2

GLASS RUN AND STRUCTURE OF FIXING THE SAME

CROSS REFERENCE TO RELATED APPLICATION

This application is based upon, claims the benefit of priority of, and incorporates by reference Japanese Patent Application No. 2005-156991 filed on May 30, 2005.

BACKGROUND OF THE INVENTION

1. Field of the Invention

The present invention relates to a glass run for a vehicle door and a structure of fixing the glass run to the vehicle door. The glass run provides a good seal and a good appearance for the vehicle door.

2. Related Art

Generally, a vehicle door is provided with a glass run, which seals a periphery of a door glass. Also, the glass run can seal and guide the door glass while the door glass is moved upwardly and downwardly. The glass run generally includes a base and a couple of sidewalls, which are substantially extended in parallel from the base. The glass run also includes a couple of seal lips, which are inwardly extended from each distal end of the sidewalls, respectively. The glass run is fixed on a channel, which is formed at an inside of a doorframe of the vehicle door. The couple of the seal lips seal both sides of a periphery of the door glass.

An interior side of the doorframe sometimes has an interior member, such as a garnish, for decoration. The interior member is fixed along the channel of the doorframe. In this case, a gap between the glass run and the interior member can be visible, thereby worsening a quality of the appearance. Therefore, some glass runs include a lip portion, which is extended from a distal end of the interior side sidewall, for covering the gap.

There is, however, a constructional difference between a roof side of the doorframe and a front pillar side of the doorframe. In this case, a manner for covering the gap between the glass run and the interior member must be changed according to the constructional difference. For example, the lip portion covers the gap between the glass run and the interior member on the roof side of the doorframe, while the lip portion is inserted into the gap between the glass run and the interior member on the front pillar side of the doorframe. As shown in FIG. 5, if a lip portion 72 at a corner 71 of a glass run 70 is continuously formed from a roof side to a front pillar side, the lip portion 72 is twisted at a portion 73 of an interior member. Then, a gap appears at the portion 73 of the interior member, thereby worsening the appearance of the glass run and the interior member.

SUMMARY OF THE INVENTION

An object of the invention is to overcome the above-mentioned limitation. A glass run according to an aspect of the present invention gives a good appearance when the glass run is fixed on a channel of a doorframe.

The glass run of the present invention for sealing a door glass fixed on a channel of a vehicle door includes a base, a couple of side walls and a couple of seal lips. The base has a longitudinally elongated body. Each side wall longitudinally extends along the base from one of the sides of the base. Each of the seal lips inwardly extends from one of a distal end of the side wall and is adapted to seal the door glass. The glass run has a cover lip and an insert lip. The cover lip outwardly extends from the distal end of the inside side wall and is adapted to cover an interior member of the vehicle door. The insert lip outwardly extends from an inside end of the side walls and is adapted to be inserted into a gap between the channel and the interior member of the vehicle door.

The glass run is formed by combining extruded portions and at least one molded portion. The extruded portions have a base, a couple of side walls and a couple of seal lips. Also, the extruded portions have a cover lip or an insert lip. On the other hand, at least one molded portion has a base, a couple of side walls, a couple of seal lips, a cover lip and an insert lip. The molded portion connects the extruded portions and is located at a corner of the vehicle door. The cover lip of the molded portion is discontinuously formed with the insert lip of the molded portion.

In another aspect of the invention, the glass run includes a molded corner portion. The molded corner portion is a portion of the glass run fixed on a channel of a vehicle door. The molded corner portion includes a base having a bent shape, a couple of side walls, which is formed along the base from one of sides of the base and a couple of seal lips, each of which inwardly extends from each of the side walls and is adapted to seal the door glass. Also, the molded corner portion includes a cover lip and an insert lip. The cover lip outwardly extends from an inside end of one of the couple of side walls. The insert lip outwardly extends from an inside end of one of the couple of side walls. The cover lip is discontinuously formed with the insert lip.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
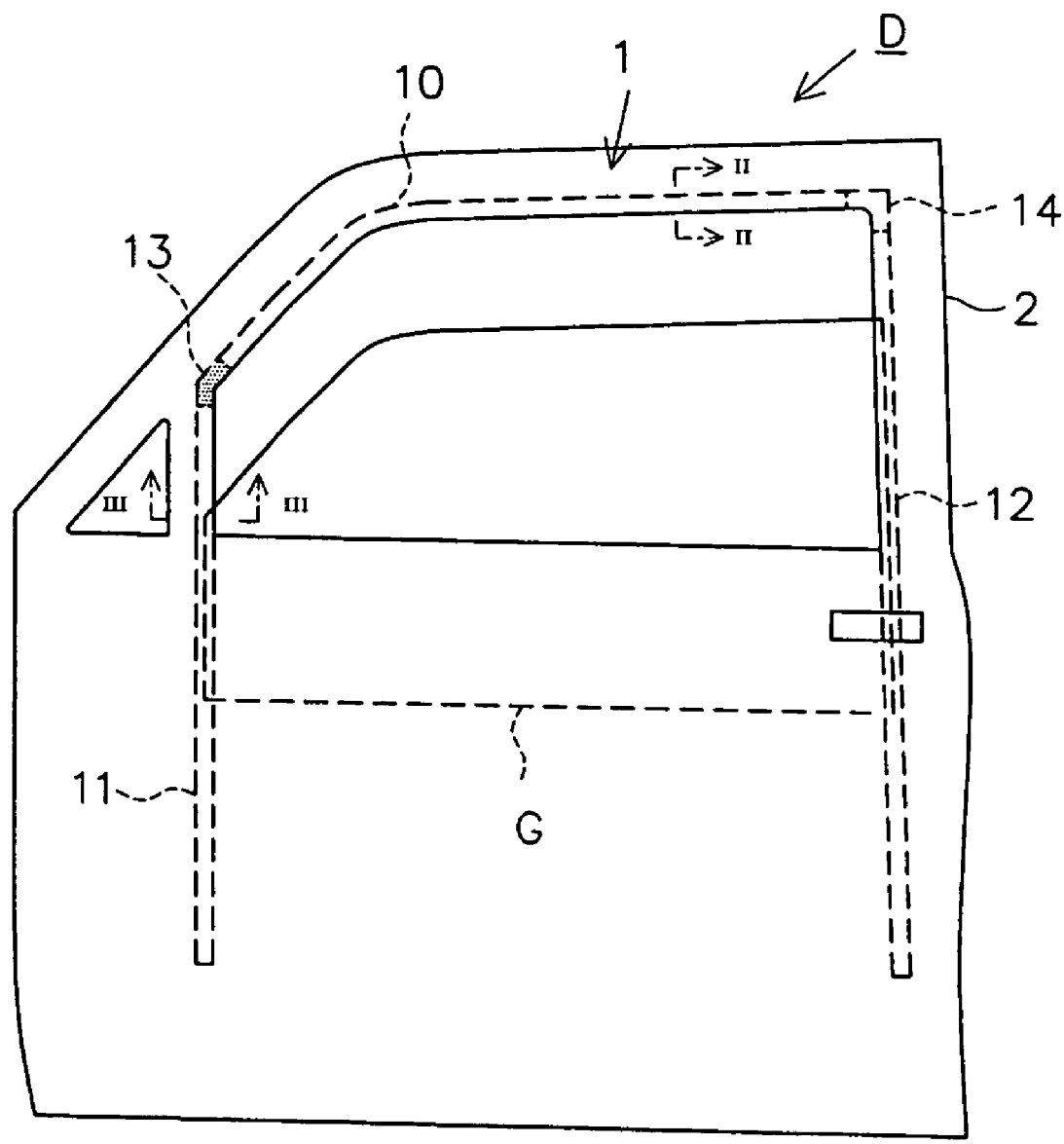
FIG. 1 is a front view of a vehicle door.
Figure 2:
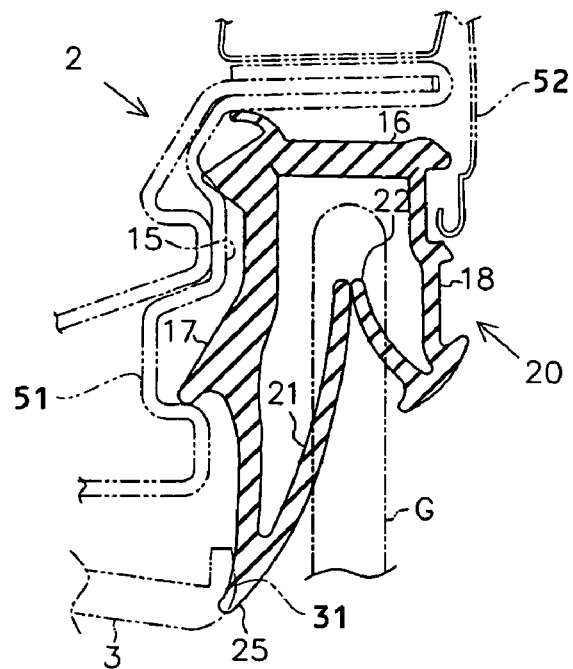
FIG. 2 is a cross sectional view along line II-II of FIG. 1.

Referring to FIG. 1, a door D for a vehicle includes a glass run 1 that seals a peripheral portion of a door glass G. As shown in FIG. 2, a garnish 3 for decorating a vehicle interior is attached along an inside portion of a doorframe 2 (an inner panel 51). An outside edge of the garnish 3 is curved along a corner part of the doorframe 2 in FIG. 4.

The glass run 1 is made of EPDM (ethylene-propylene-diene-copolymer) solid rubber. The glass run 1 can be made of any other rubber materials or thermoplastic elastomers. As shown in FIG. 1, the glass run 1 includes an upper extruded portion 10, front and rear side vertical extruded portions 11, 12 and molded corner portions 13, 14 that connect each end of the upper extruded portion 10 to one end of each of the vertical extruded portions 11, 12. The upper extruded portion 10 and the vertical extruded portions 11, 12 have an elongated straight body and are formed by an extruder (not shown). The upper extruded portion 10 and the vertical extruded portion 11 are set in a mold apparatus (not shown) at a predetermined angle. Then the molded corner portion 13 is formed by the mold apparatus. Thus, the molded corner portion 13 is continuously formed with the upper extruded portion 10 and the vertical extruded portion 11. Identically, another mold apparatus can form the molded corner portion 14 in the same manner. In the present embodiment, the upper extruded portion 10 is a first extruded portion, and the vertical extruded portions 11 is a second extruded portion.

Figure 3:
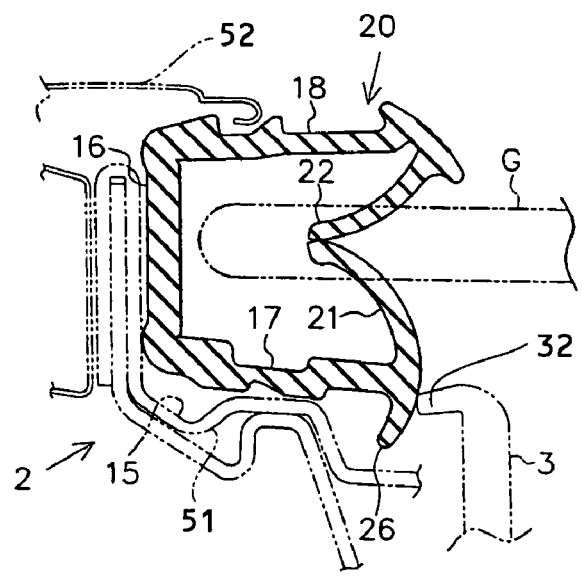
FIG. 3 is a cross sectional view along line III-III of FIG. 1.

As shown in FIGS. 2 and 3, the glass run 1 is fixed to a channel 15, which is formed at an inside of the doorframe 2 of a door by an inner panel 51 and a molding member 52. The glass run 1 includes a body portion 20 and a couple of seal lips 21, 22. The body portion 20 has a flat base 16 and a couple of side walls, which are an inside wall portion 17 and an outside wall portion 18. The inside wall portion 17 and the outside wall portion 18 are substantially extended in parallel from the base 16. Therefore, the body portion 20 is U-shaped in cross-section. The seal lips 21, 22 are inwardly extended into the body portion 20 from each end of the inside wall portion 17 and the outside wall portion 18. The seal lips 21, 22 seal a peripheral portion of the door glass G. Also, the seal lips 21, 22 can seal the door glass G while the door glass G moves up and down.

Referring to FIG. 2, the upper extruded portion 10 also has a cover lip 25, which contacts an end face 31 of the garnish 3 and covers a gap between the channel 15 and the garnish 3. The cover lip 25 extends from an end of the inside wall portion 17 and is smoothly formed with the seal lip 21. Therefore, the seal lip 21 and the cover lip 25 have a good appearance.

Referring to FIG. 3, the vertical extruded portion 11 also has an insert lip 26, which is inserted between the channel 15 and a bent end 32 of the garnish 3. The insert lip 26 is perpendicularly protruded from the inside wall portion 17 and is smoothly formed with the seal lip 21.

Figure 4:
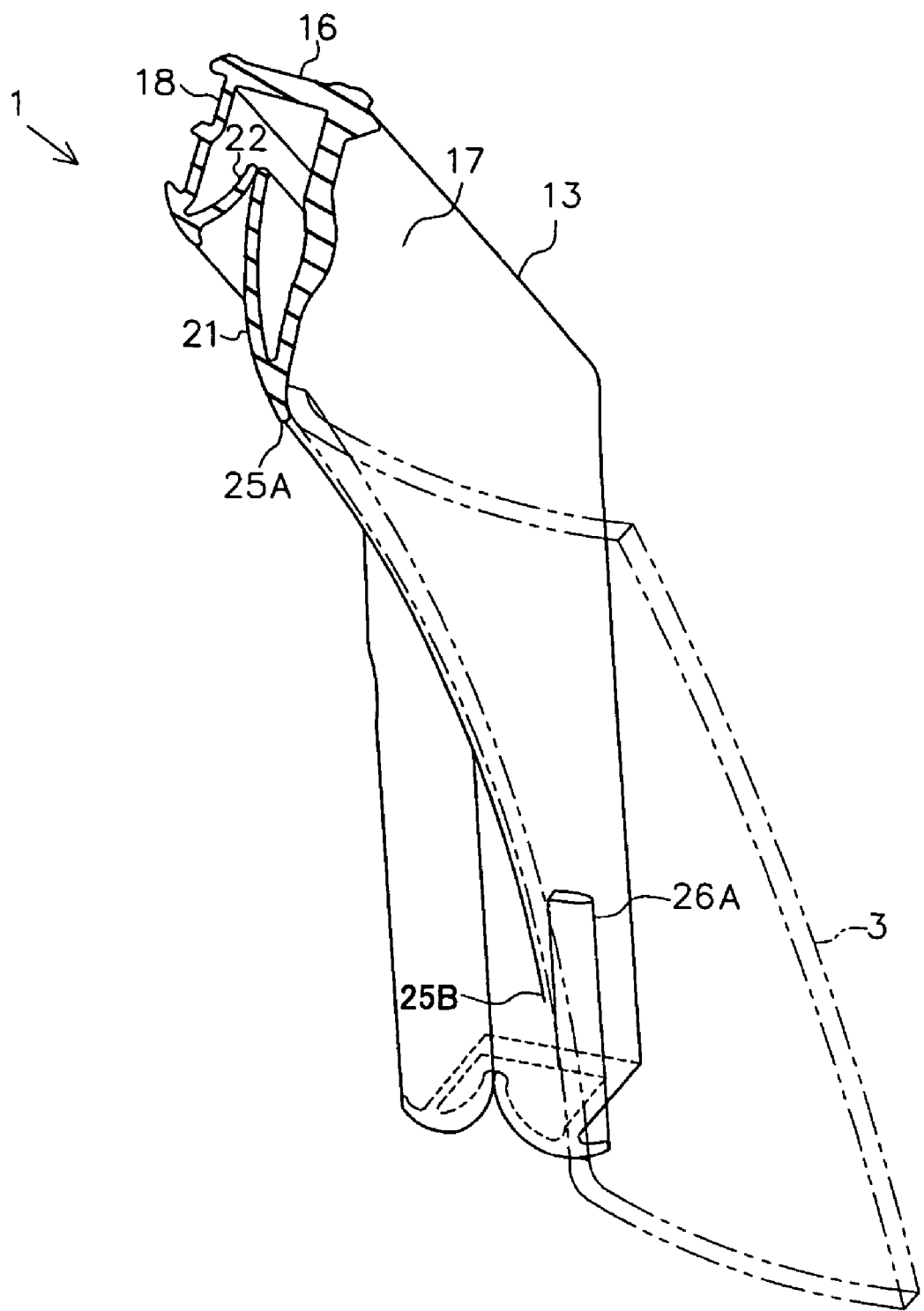
FIG. 4 is a partial perspective view of a glass run at a corner thereof according to an embodiment.
Figure 5:
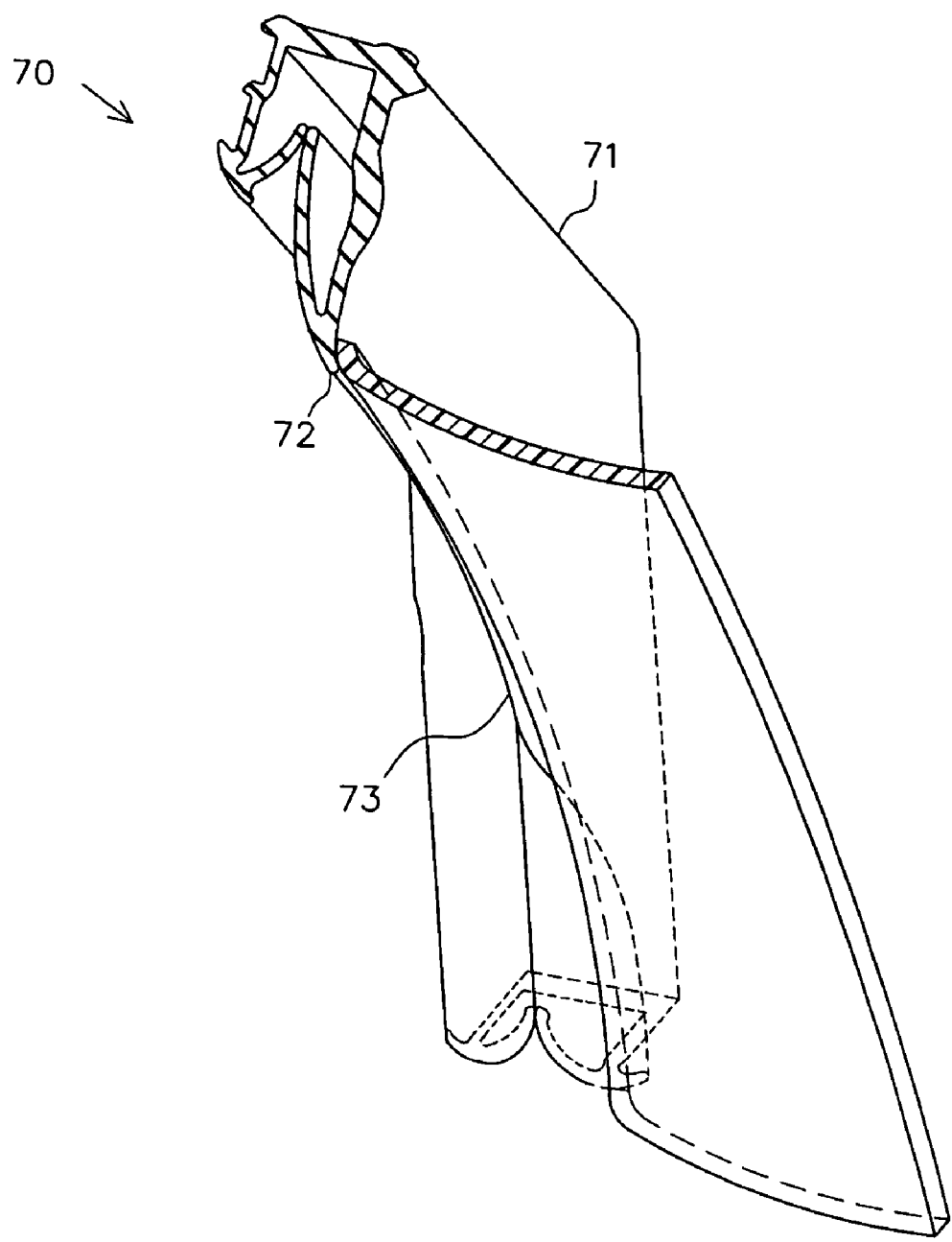
FIG. 5 is a partial perspective view of a conventional glass run at a corner thereof.

As shown in FIG. 4, the molded corner portion 13 has a cover lip 25A, which is continuously formed with the cover lip 25 (shown in FIG. 2) of the upper extruded portion 10, and an insert lip 26A, which is continuously formed with the insert lip 26 (shown in FIG. 3) of the vertical extruded portion 11. The cover lip 25A is formed from the boundary of the upper extruded portion 10 toward the boundary of the vertical extruded portion 11. The cover lip 25A is gradually sloped down along the base 16 of the molded corner portion 13. Then, a hem 25B of the cover lip 25A is smoothly matched with a surface of the seal lip 21 of the molded corner portion 13. The insert lip 26A is formed from the boundary of the vertical extruded portion 11 along the base 16 of the molded corner portion 13, which connects with the insert lip 26 of the vertical extruded portion 11. The cover lip 25A is discontinuously formed with the insert lip 26A on the molded corner portion 13. The cover lip 25A and the insert lip 26A overlap each other by a predetermined length around the inside wall portion 17 and the seal lip 21 of the molded corner portion 13.

As shown in FIG. 4, the cover lip 25A contacts the end face 31 of the garnish 3 and the insert lip 26A is inserted between the channel 15 and the bent end 32 of the garnish 3 when the glass run 1 is fixed to the channel 15. The garnish 3 is also curved along the cover lip 25A at the corner of the doorframe 2. The cover lip 25A covers a curved portion of the garnish 3.

As mentioned above, the cover lip 25A and the insert lip 26A are discontinuously formed from each other on the molded corner portion 13 and overlap each other by a predetermined length, which is about one sixth of the curved length of the molded corner portion 13. Therefore, the cover lips 25A and the insert lip 26A engage with the garnish 3 differently. Thus, the cover lip 25A and the insert lip 26A are not twisted by the garnish 3. Further, the cover and insert lips 25A, 26A do not make a gap with the garnish 3, thereby ensuring a good appearance between the molded corner portion 13 and the garnish 3.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A glass run for sealing a door glass, wherein the glass run is adapted to be fixed on a channel of a vehicle door, the glass run comprising:

a first extrusion including a first base, which has a longitudinally elongated body, a first couple of side walls, each of which longitudinally extends along the first base from one side of the first base, a first couple of seal lips, each of which inwardly extends from a respective one of the first couple of side walls, wherein the first couple of seal lips is adapted to seal a peripheral portion of the door glass, and a cover lip, which outwardly extends from an inside end of an inner side wall of the first couple of side walls and is adapted to cover a side end of an interior member of the vehicle door;

a second extrusion including a second base, which has a longitudinally elongated body, a second couple of side walls, each of which longitudinally extends along the second base from one side of the second base, a second couple of seal lips, each of which inwardly extends from a respective one of the second couple of side walls, wherein the second couple of seal lips is adapted to seal the peripheral portion of the door glass, and an insert lip, which outwardly extends from an inside end of an inner side wall of the second couple of side walls and is adapted to be inserted below the side end of the interior member of the vehicle door; and a molded corner portion, which connects the first extrusion and the second extrusion and is adapted to be set at a corner of the vehicle door, the molded corner portion including a molded base, which has an angled body, a couple of molded side walls, each of which is formed along the molded base from one side of the molded base, a couple of molded seal lips, each of which inwardly extends from a respective one end of the molded side walls, wherein the couple of molded seal lips is adapted to seal the peripheral portion of the door glass, a molded cover lip, which is continuously formed with the cover lip of the first extrusion and outwardly extends from an inside end of an inner side wall of the couple of the molded side walls, and a molded insert lip, which is continuously formed with the insert lip of the second extrusion and outwardly extends from an inside surface of the inner side wall of the couple of the molded side walls, wherein the molded corner portion has a first end, which is joined with the first extrusion, and a second end, which is joined with the second extrusion, and a middle part, which is located between the first end and the second end, wherein the molded cover lip extends continuously from the first end toward the second end and terminates at a hem, which is located at an inside end of the inner side wall of the couple of the molded sidewalls and above the second end, wherein the molded insert lip extends from the second end of the molded corner part towards the middle part in a vertical direction and terminates at a point that is between a top of the middle part and the second end, and the molded insert lip is continuously formed with the insert lip of the second extrusion at the second end, and wherein the molded cover lip and the molded insert lip are separate from one another and discontinuous, wherein the molded cover lip and the molded insert lip overlap with each other by a predetermined length on the molded corner portion.

2. A glass run according to claim 1, wherein a distal end of the hem decreases from the first end toward the second end, and the hem is smoothly matched with a surface of the molded seal lip.

3. A glass run according to claim 2, wherein the hem of the molded cover lip extends in an extending direction of the inner side wall of the couple of the molded side walls, and a distal end of the hem of the molded cover lip is smoothly matched with a surface of the molded seal lip.

4. A glass run according to claim 1, wherein the molded insert lip extends in a direction that is perpendicular to an extending direction of the inner side wall of the couple of the molded side walls.

5. A fixing structure for fixing a glass run to a channel of a vehicle door, comprising:
an interior member, which has a side end and is fixed along the channel of the vehicle door;
a first extrusion including a first base, which has a longitudinally elongated body, a first couple of side walls, each of which longitudinally extends along the first base from one side of the first base, a first couple of seal lips, each of which inwardly extends from an end of a respective one of the first couple of side walls, and is adapted to seal a peripheral portion of a door glass, and a cover lip, which outwardly extends from an inside end of an inner side wall of the first couple of side walls and covers the side end of the interior member of the vehicle door;
a second extrusion including a second base, which has a longitudinally elongated body, a second couple of side walls, each of which longitudinally extends along the second base from one side of the second base, a second couple of seal lips each of which inwardly extends from an end of a respective one of the second couple of side walls, and is adapted to seal the peripheral portion of the door glass, and an insert lip, which outwardly extends from an inside end of an inner side wall of the second couple of side walls and is inserted into a gap between the channel and the side end of the interior member of the vehicle door; and
a molded corner portion, which connects the first extrusion and the second extrusion and is adapted to be set at a corner of the vehicle door, including a molded base, which has a bent shape, a couple of molded side walls, each of which is formed along the molded base from one side of the molded base, a couple of molded seal lips, each of which inwardly extends from an end of one of a respective one of the molded side walls, and is adapted to seal the peripheral portion of the door glass, a molded cover lip, which is continuously formed with the cover lip of the first extrusion and outwardly extends from an inside end of an inner side wall of the couple of the molded side walls, and a molded insert lip, which is continuously formed with the insert lip of the second extrusion and outwardly extends from an inside surface of the inner side wall of the couple of the molded side walls, wherein the molded corner portion has a first end, which is joined with the first extrusion, and a second end, which is joined with the second extrusion, and a middle part, which is located between the first end and the second end, wherein the molded cover lip extends continuously from the first end toward the second end and terminates at a hem, which is located at the inside end of the inner side wall of the couple of the molded side walls and above the second end, wherein the molded insert lip extends from the second end of the molded corner part towards the middle part in a vertical direction and terminates at a point that is between a top of the middle part and the second end, and the molded insert lip is continuously formed with the insert lip of the second extrusion at the second end, wherein the molded cover lip and the molded insert lip are separate from one another and discontinuous, and the molded cover lip and the molded insert lip overlap with each other by a predetermined length on the molded corner portion, wherein the side end of the interior member is continuously curved along the molded cover lip.

6. A fixing structure for fixing a glass run according to claim 5, wherein a curved portion of the interior member is covered by the molded cover lip.

7. A glass run according to claim 1, wherein
a distal end of the molded cover lip extends continuously along a distal end of the inner side wall from the first end of the molded corner portion to the hem, and
a lower end of the molded cover lip terminates at a location that is between the second end of the molded corner part and the point at which the molded insert lip terminates.

8. A glass run according to claim 7, wherein the molded cover lip is adapted to contact only one side of the interior member.

9. A fixing structure for fixing a glass ran according to claim 5, wherein
a distal end of the molded cover lip extends continuously along a distal end of the inner side wall from the first end of the molded corner portion to the hem, and
a lower end of the molded cover lip terminates at a location that is between the second end of the molded corner part and the point at which the molded insert lip terminates.

10. A fixing structure for fixing a glass run according to claim 9, wherein the molded cover lip contacts only one side of the interior member.

11. A glass run according to claim 1, wherein the molded insert lip is adapted to contact the interior member at the second end of the molded corner part.

12. A fixing structure for fixing a glass run according to claim 5, wherein the molded insert lip contacts the interior member at the second end of the molded corner part.

* * * * *